United States Patent
Kuettel et al.

(10) Patent No.: US 9,075,816 B2
(45) Date of Patent: Jul. 7, 2015

(54) SYSTEM AND METHOD OF COMPRESSING DATA IN FONT FILES

(75) Inventors: David Kuettel, San Jose, CA (US); Raphael Linus Levien, Berkeley, CA (US)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 13/592,644

(22) Filed: Aug. 23, 2012

(65) Prior Publication Data

US 2013/0051690 A1     Feb. 28, 2013

Related U.S. Application Data

(60) Provisional application No. 61/526,989, filed on Aug. 24, 2011.

(51) Int. Cl.
    *G06F 17/30*     (2006.01)
    *G06F 17/21*     (2006.01)

(52) U.S. Cl.
    CPC ........ *G06F 17/30153* (2013.01); *G06F 17/214* (2013.01); *G06F 17/30091* (2013.01)

(58) Field of Classification Search
None
See application file for complete search history.

(56) References Cited

U.S. PATENT DOCUMENTS

| | | | |
|---|---|---|---|
| 5,045,852 A | 9/1991 | Mitchell et al. | |
| 5,880,688 A | 3/1999 | Rust | |
| 6,031,622 A * | 2/2000 | Ristow et al. | 358/1.11 |
| 7,184,046 B1 | 2/2007 | Hawkins | |
| 2003/0043151 A1 * | 3/2003 | Choi et al. | 345/467 |
| 2009/0177416 A1 * | 7/2009 | Nilsagard et al. | 702/41 |

FOREIGN PATENT DOCUMENTS

| | | |
|---|---|---|
| EP | 0735496 | 10/1996 |
| EP | 2312458 | 4/2011 |

OTHER PUBLICATIONS

PCT International Search Report corresponding to PCT Application No. PCT/US2012/052026, filed Aug. 23, 2012, International Search Report issued Mar. 5, 2013, pp. 1-6.
PCT Written Opinion of the International Search Authority corresponding to PCT Application No. PCT/US2012/052026, filed Aug. 23, 2012, Written Opinion issued Mar. 5, 2013, pp. 7-15.
"TrueType", downloaded from http://en.wikipedia.org/wiki/TrueType, Jan. 5, 2012, 7 pages.
"Web Open Font Format", downloaded from http://en.wikipedia.org/wiki/Web_Open_Font_Format, Nov. 7, 2011, 3 pages.
"Products and Services", downloaded from http://monotypeimaging.com/productsservices/microtype_2.aspx?prn=yes, Nov. 7, 2011, 1 page.
"Arithmetic Coding", downloaded from http://en.wikipedia.org/wiki/Arithmetic_coding, Nov. 7, 2011, 7 pages.

(Continued)

*Primary Examiner* — Chan Park
*Assistant Examiner* — Eueng-Nan Yeh
(74) *Attorney, Agent, or Firm* — Lerner, David, Littenberg, Krumholz & Mentlik, LLP

(57) ABSTRACT

A compressed font file including compressed data is received. The compressed data is decompressed to generate decompressed data. An attempt to validate the decompressed data is made. Within the decompressed data, a predetermined pattern of invalid data corresponding to an element of a font file is detected. The font file is reconstructed by replacing at least some of the invalid data with the element.

13 Claims, 17 Drawing Sheets

(56) References Cited

OTHER PUBLICATIONS

"JBIG2", downloaded from http://en.wikipedia.org/wiki/JBIG2, Nov. 7, 2011, 4 pages.

Marpe, Detlev et al., "Context-Based Adaptive Binary Arithmetic Coding in the H.264/AVC Video Compression Standard", IEEE Transactions on Circuits and Systems for Video Technology, Jul. 2003, 17 pages, vol. 13, No. 7.

"Weibull Based Incremental Adaptive Arithmetic Coding with File Partition Technique", downloaded from http://ieeexplore.ieee.org/xpl/freeabs_all.jsp?arnumber=5665145, Nov. 7, 2011, 2 pages.

Butler, Jon et al., "A Proposal for Shared Dictionary Compression Over HTTP", Sep. 8, 2008, 17 pages.

Martin Sarah et al, "MicroType Express (MTX) Font Format", downloaded from URL: http://www.w3.org./Submission/2008/SUBM-MTX-20080305, Mar. 1, 2008, sections 4, 5.1, 5.6 and 5.7, pp. 5-6, and 17.

Jonathan Kew et al. "WOFF File Format", downloaded from URL: http://www.jfkew.plus.com/woff/woff.htm, Jan. 1, 2009, pp. 1-6.

Communication Relating to the Results of the Partial International Search, Annex to Form PCT/ISA/206, PCT/2012/052026, Issued Dec. 17, 2012, pp. 3-4.

\* cited by examiner

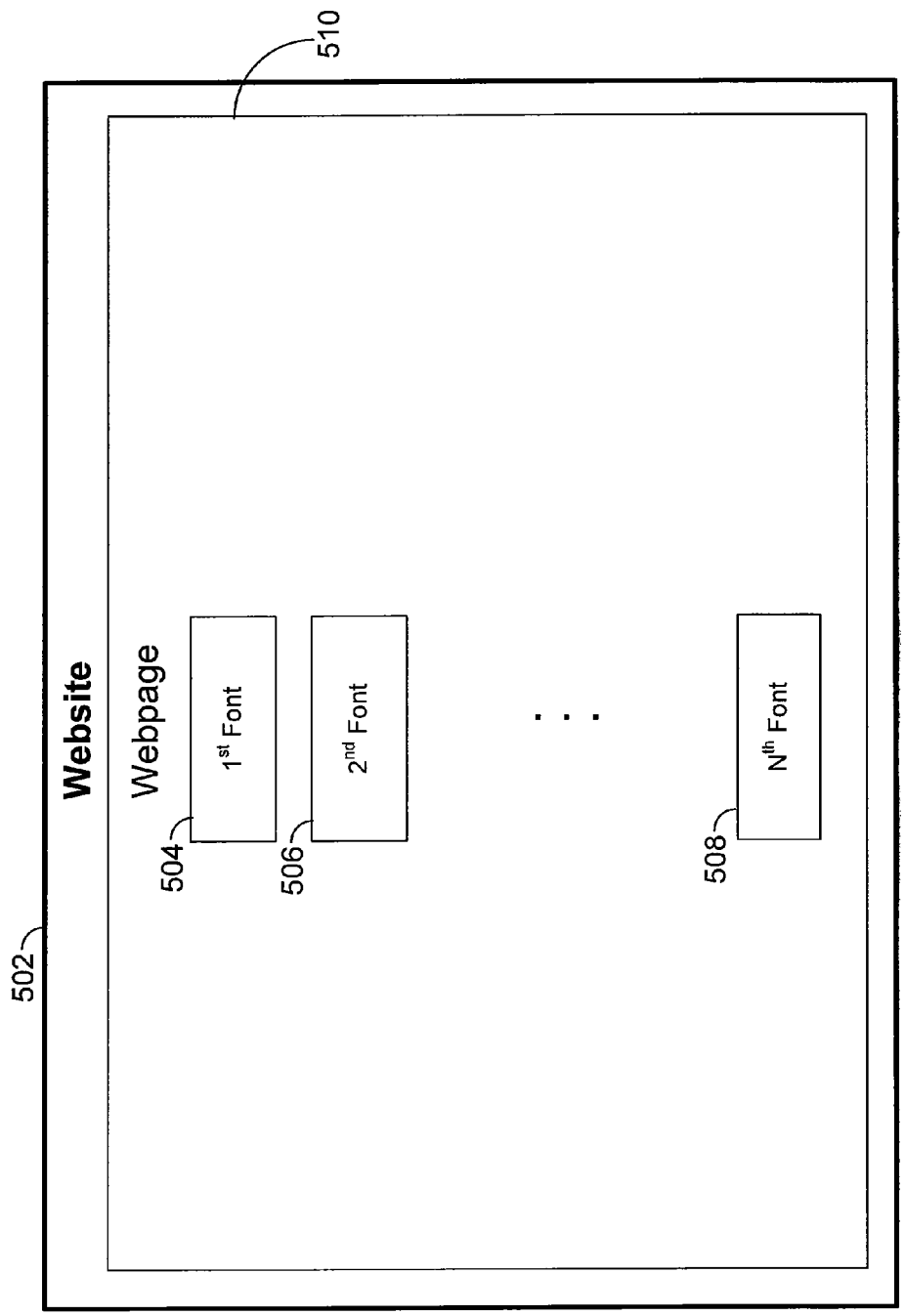

SYSTEM AND METHOD OF COMPRESSING DATA IN FONT FILES

CROSS REFERENCE TO RELATED APPLICATIONS

This application claims benefit, pursuant to 35 U.S.C. §119(e), to U.S. Provisional Application Ser. No. 61/526,989 filed Aug. 24, 2011, which is hereby incorporated herein by reference in its entirety.

TECHNICAL FIELD

This specification relates generally to systems, methods and apparatus for compression and decompression of fonts and more particularly to systems, methods and apparatus compression and decompression of fonts in a font file.

BACKGROUND

Existing systems provide limited compression of font files. In existing systems, font files may be compressed using a compression algorithm prior to transmission. At the receiver, the compressed font files may be decompressed. However, such existing systems create a delay in font load time, while the font files are being decompressed.

SUMMARY

In accordance with an embodiment, a compressed font file including compressed data is received. The compressed data is decompressed to generate decompressed data. An attempt is made to validate the decompressed data. Within the decompressed data, a predetermined pattern of invalid data corresponding to an element of a font file are detected. The font file is reconstructed by replacing at least some of the invalid data with the element.

In another embodiment, the element includes at least one of: a bounding box associated with a glyph in the font file; and a loca table. In an embodiment, the element includes the loca table and wherein the loca table includes an indication of a start position of an entry within the loca table. In an embodiment, the loca table is derived by scanning through a glyph table.

In another embodiment, valid data is detected within the decompressed data. In an embodiment, reconstructing the font file further includes reconstructing the font file to include the valid data.

In another embodiment, the predetermined pattern of invalid data includes a predetermined number of zeroes.

In accordance with an embodiment, redundant and non-redundant data are identified in a table within a font file. A zeroing out procedure is applied to replace the identified redundant data. The font file is compressed to generate a compressed font file. The compressed font file is transmitted.

In another embodiment, the redundant data includes at least one of: a bounding box associated with a glyph in at least one of a plurality of tables in the font file; and a loca table.

In another embodiment, the redundant data includes the loca table and wherein the loca table includes an indication of a start position of an entry within the loca table. In an embodiment, the loca table is derived by scanning through a glyph table.

In another embodiment, the identified redundant data is replaced with data arranged in a predetermined pattern. In an embodiment, the predetermined pattern includes a predetermined number of zeroes.

These and other advantages of the present disclosure will be apparent to those of ordinary skill in the art by reference to the following Detailed Description and the accompanying drawings.

BRIEF DESCRIPTION OF THE DRAWINGS

FIG. 5 shows a plurality of fonts displayed on a webpage in accordance with an embodiment;

DETAILED DESCRIPTION

Figure 1:
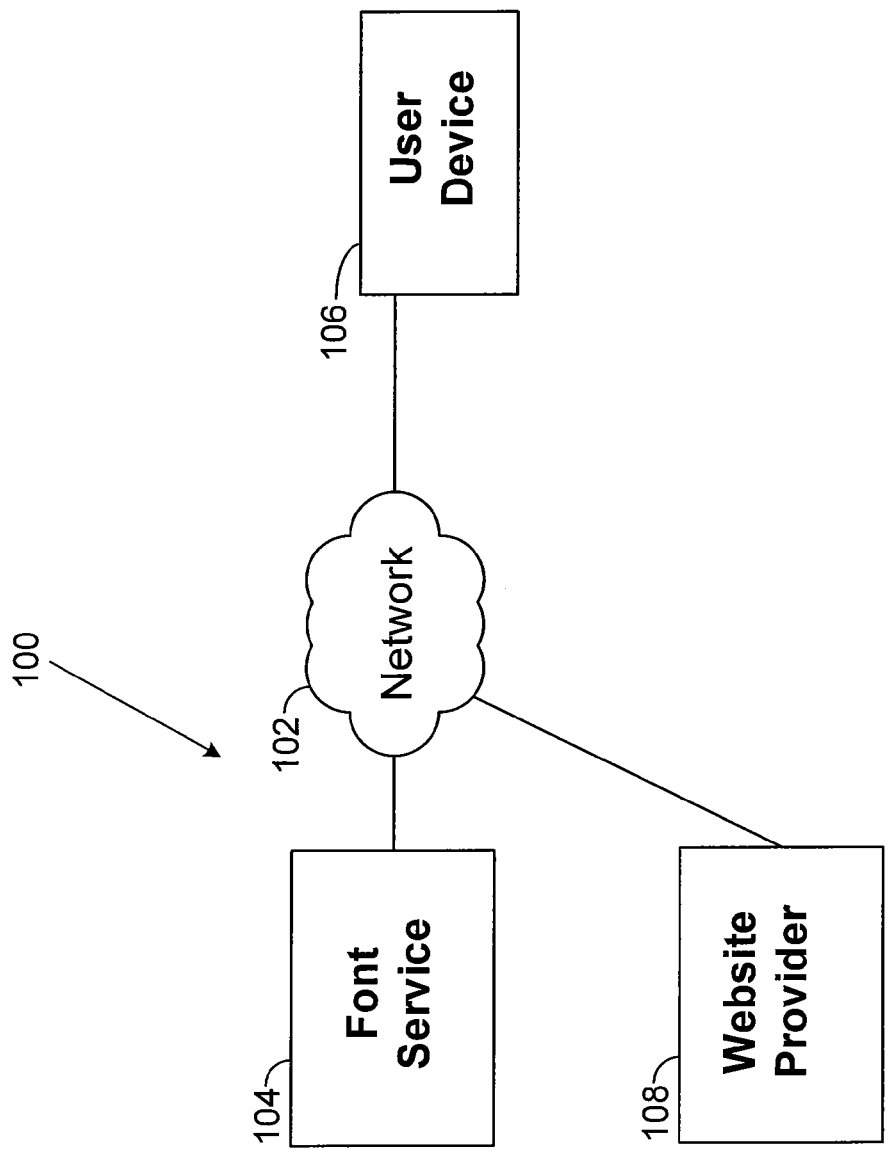
FIG. 1 shows a communication system that may be used to provide fonts in accordance with an embodiment.

FIG. 1 shows a communication system 100 that may be used to provide fonts in accordance with an embodiment. Communication system 100 includes a network 102, a font service 104, a user device 106, and a website provider 108. Communication system 100 may include more than one user device. These devices and/or servers communicate with each other using network 102.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 102 may include a combination of different types of networks.

Font service 104 maintains, and makes available to users, a plurality of fonts that may be used, for example, to render and display text on a webpage. Website provider 108 may maintain a website 502, shown in FIG. 5. Alternatively, website 502 may be hosted by font service 104 or may be hosted by another service (not shown).

Figure 2:
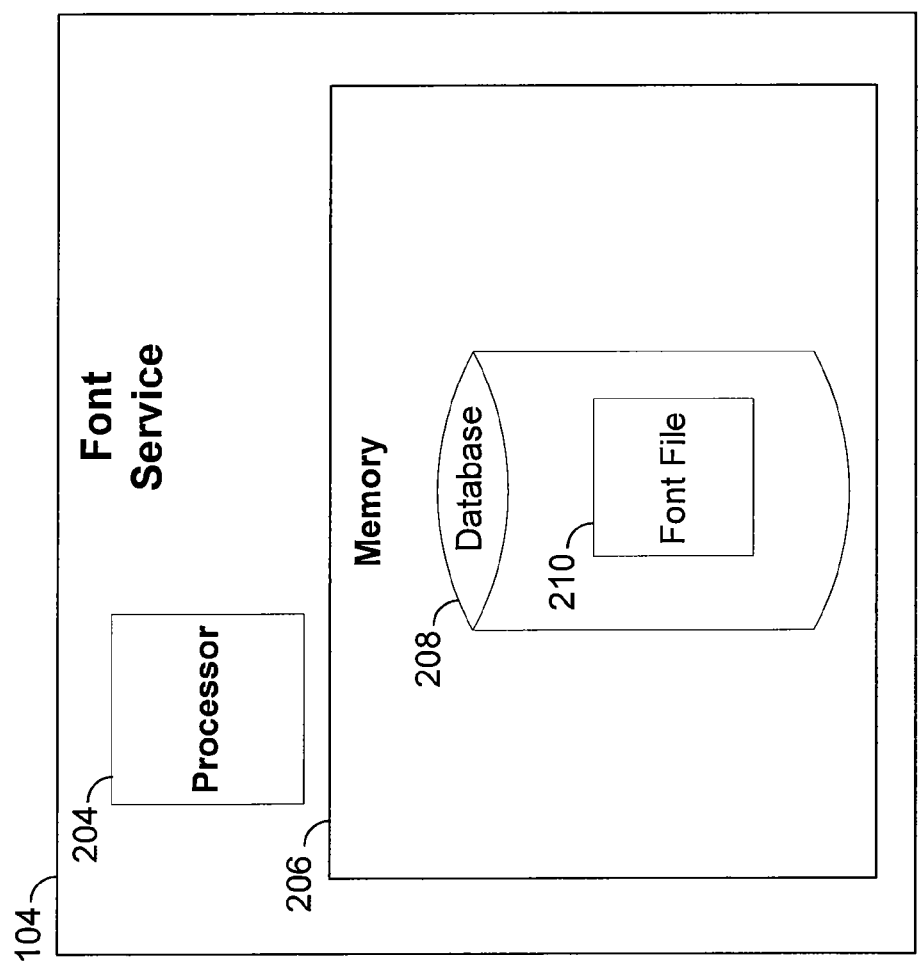
FIG. 2 shows functional components of an exemplary font service in accordance with an embodiment.

FIG. 2 shows functional components of an exemplary font service 104 in accordance with an embodiment. Font service 104 includes a processor 204 and a memory 206. Memory 206 includes one or more font files 210. Font service 104 may include other components not shown in FIG. 2. In the illustrative embodiment, font file 210 and related font data are stored in a database 208 within memory 206. Database 208 may maintain one or more font file 210 and related font data. In an alternative embodiment, font file 210 and font data may be stored in external memory located remote from font service 104.

Figure 3:
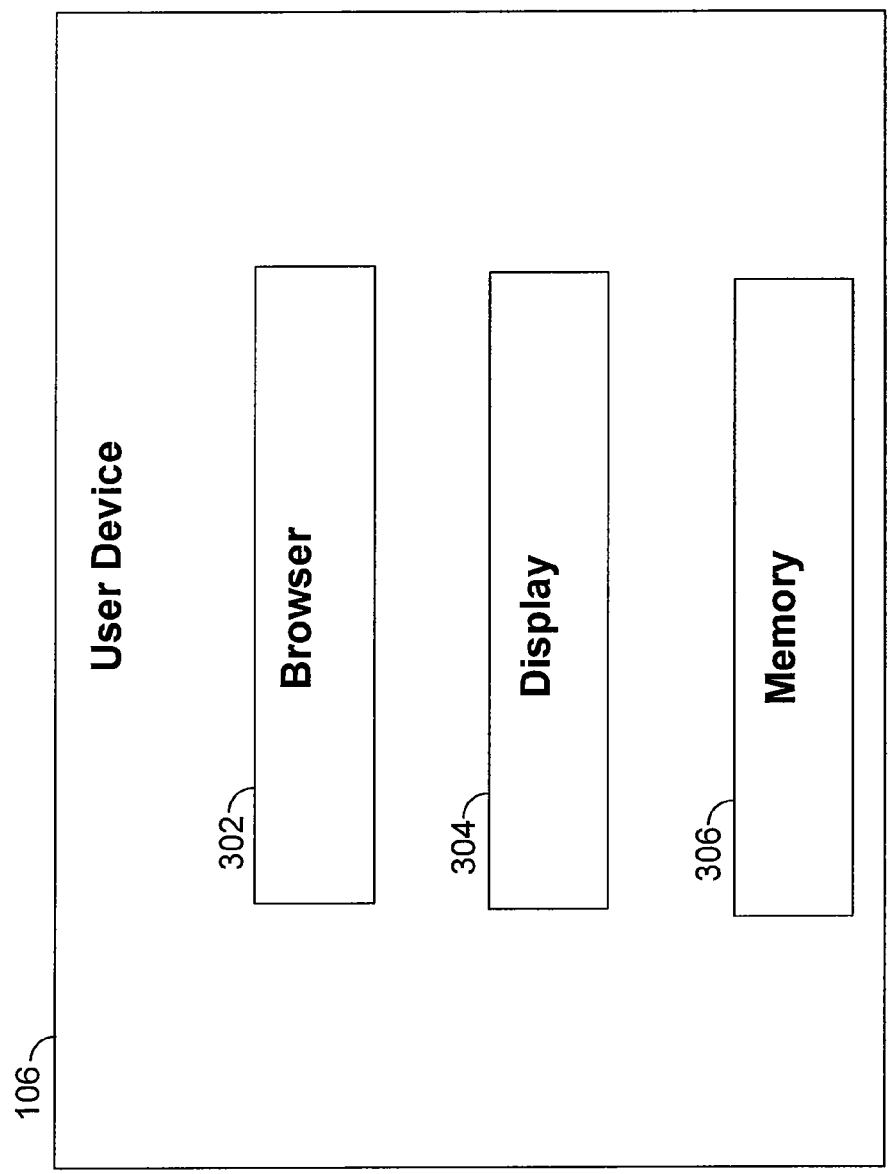
FIG. 3 shows functional components of an exemplary user device in accordance with an embodiment.

FIG. 3 shows functional components of an exemplary user device 106 in accordance with an embodiment. User device 106 includes a browser 302, a display 304 and a memory 306. Browser 302 may be a conventional web browser used to access World Wide Web sites via the Internet, for example. Display 304 displays webpages, images and other information. For example, a user employing user device 106 may use display 304 to view and/or otherwise access website 502, shown in FIG. 5.

User device 106 may be connected to network 102 through a direct (wired) link, or wirelessly. User device 106 may have a display screen (not shown) for displaying information. For example, user device 106 may be a personal computer, a laptop computer, a workstation, a mainframe computer, a mobile communication device such as a wireless phone, a personal digital assistant, cellular device, a laptop computer, a netbook, a tablet device, an electron book reader, etc. Other devices may be used.

Figure 4:
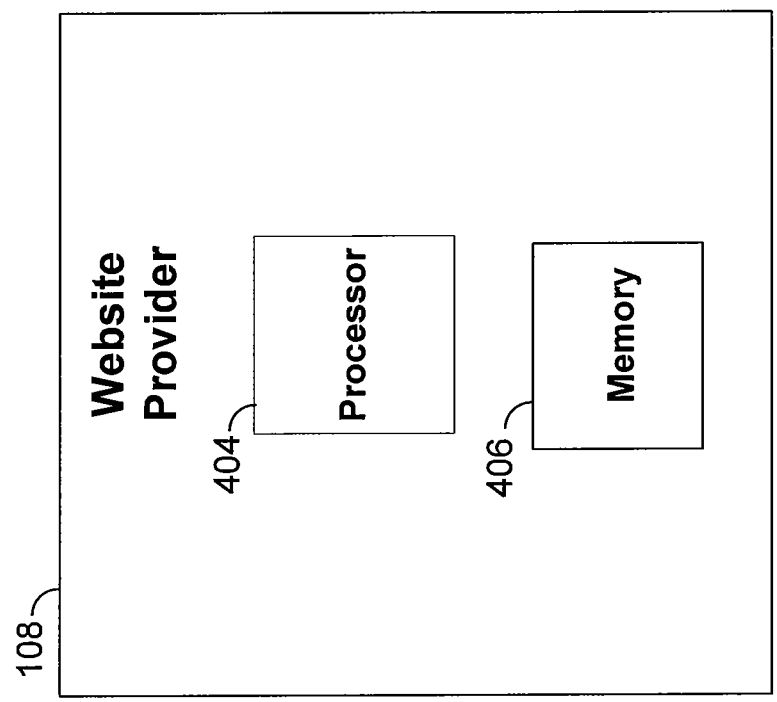
FIG. 4 shows functional components of an exemplary website provider in accordance with an embodiment.

FIG. 4 shows functional components of an exemplary website provider 108 in accordance with an embodiment. Website provider 108 includes a processor 404 and a memory 406. Website provider 108 may include other components not shown in FIG. 4. Website provider 108 may host website 502. Website provider 108 may include a server. In an alternate embodiment, website 502 may be hosted by another device and/or server.

FIG. 5 shows a plurality of fonts displayed on a webpage 510 in accordance with an embodiment. In an embodiment, website provider 108 hosts website 502 including webpage 510. Webpage 510 provides a user employing user device 106 with a visual representation of text rendered using a plurality of fonts. In the illustrative embodiment, a $1^{st}$ font 504 may be applied to a portion of text within webpage 510; a $2^{nd}$ font 506 may be applied to another portion of text within webpage 510; and an $N^{th}$ font 508 may be applied to another portion of text within webpage 510. In order to display text rendered using a particular font, such as font 504, 506 or 508, to the user, user device 106 receives a respective font file containing data related to the particular font. After the font files is received and/or downloaded from font service 104 and cached or saved (e.g. as cookies) by user device 106, text contained within webpage 510 may be rendered using the particular font.

Figure 6A:
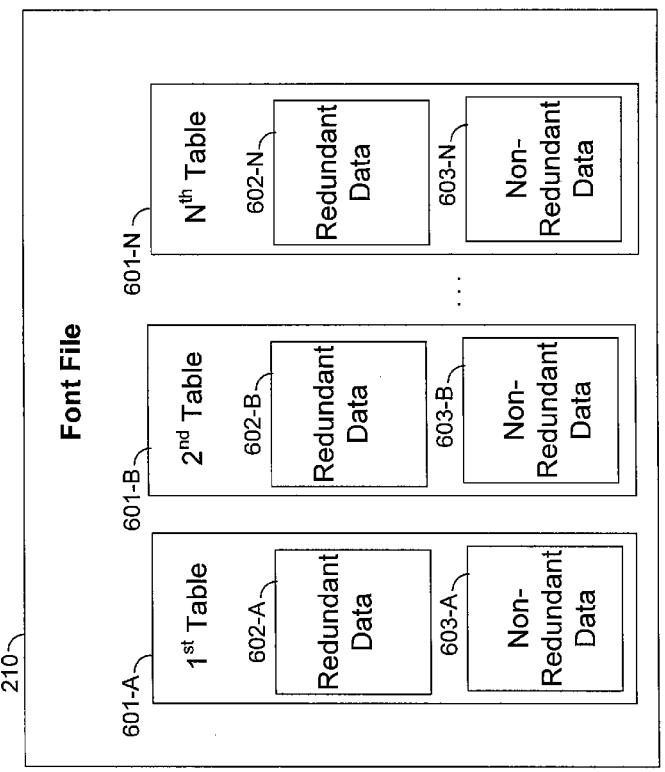
FIG. 6A shows an exemplary font file in accordance with an embodiment.

FIG. 6A shows an exemplary font file 210 in accordance with an embodiment. Font file 210 contains data that defines one or more aspects of a font. Some of the data is organized in one or more tables. Furthermore, some of the data in the font file is redundant. In the illustrative embodiment of FIG. 6A, font file 210 includes a plurality of tables 601-A, 601-B, ..., 601-N (hereinafter referred to collectively as 601). Each of the plurality of tables 601 includes respective redundant and non-redundant data. $1^{st}$ table (601-A) includes redundant data 602-A and non-redundant data 603-A; $2^{nd}$ table (601-B) includes redundant data 602-B and non-redundant data 603-B; and $N^{th}$ table (601-N) includes redundant data 602-N and non-redundant data 603-N. Fewer or more tables than depicted in FIG. 6A may be included in font file 210. One or more types of redundant data in font file 210 are hereinafter referred to as redundant data 602. One or more types of non-redundant data in font file 210 are hereinafter referred to as non-redundant data 603.

Figure 6B:
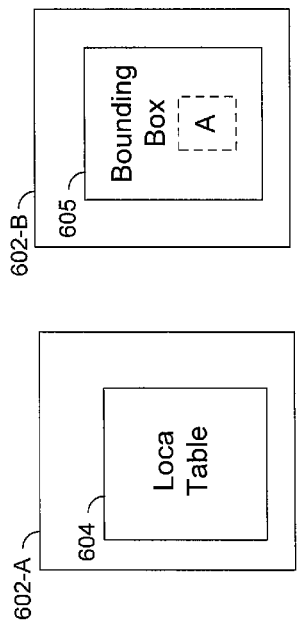
FIG. 6B shows exemplary redundant data in accordance with an embodiment.

FIG. 6B shows exemplary redundant data 602 in accordance with an embodiment. In the illustrative embodiment, redundant data 602-A (within font table 601-A) includes a loca table 604, and redundant data 602-B (within font table 601-B) includes a bounding box 605. In the illustrative embodiment of FIG. 6B, bounding box 605 encircles the glyph and/or letter "A". Bounding box 605 may encompass a plurality of bounding boxes around a plurality of respective letters/characters. In an embodiment, redundant data 602-B may include one or more bounding boxes for glyphs within glyph tables.

In an illustrative embodiment depicted by FIG. 6B, table 601-A includes redundant data 602 including loca table 604, and table 601-B includes glyph bounding box 605. Table 601-A and table 601-B may include one or more of glyph tables, loca tables, etc. which make up font file 210.

In an embodiment, an entry in a glyph table includes an entry to a glyph. Loca table 604 includes various entries indicating the position (e.g. the start position) or location of each of the entries. For example, a loca table may indicate that an entry to the letter "A" begins at location "X." Therefore, detection of the glyph and where it is located can be performed based on a loca table. Loca table 604 may be derived by scanning through a glyph table.

Some examples of redundant data include:

Bounding boxes of glyphs—which may be derived from glyph outline data;

A loca table—which may be derived by scanning the glyph table sequentially and determining the size of each glyph;

Redundancy in the name table—for example, encodings for a first type of operating system (OS) and a second type of OS are present but have the same data;

Redundancy in some flags and metadata—for example three sets of vertical metrics;

Redundancy in "Character To Glyph Index Mapping" or "cmap" tables—for example, if a type 12 (4-byte Unicode) table is present, the type 4 (2-byte Unicode Bitmap or BMP) may be derived from it;

Redundancy in the post table—for example, multiple entries can be derived from standard tables such as a glyph list;

Data in "Kerning" or "kern" table may be redundant with kerning information in a Glyph Positioning (GPOS) table; and Glyph references in composite characters.

In an embodiment, glyph references in composite characters may be standard, for example an "agrave" character may be composed of "a" and "grave."

Other types of redundant data may be included in font files.

Compression

When a user employing user device 106 requests access to view webpage 510 (e.g. by selection of a uniform resource locator of webpage 510, or by another method), user device 106 transmits a request to retrieve font file 210 from font service 104, via network 102.

Figure 7:
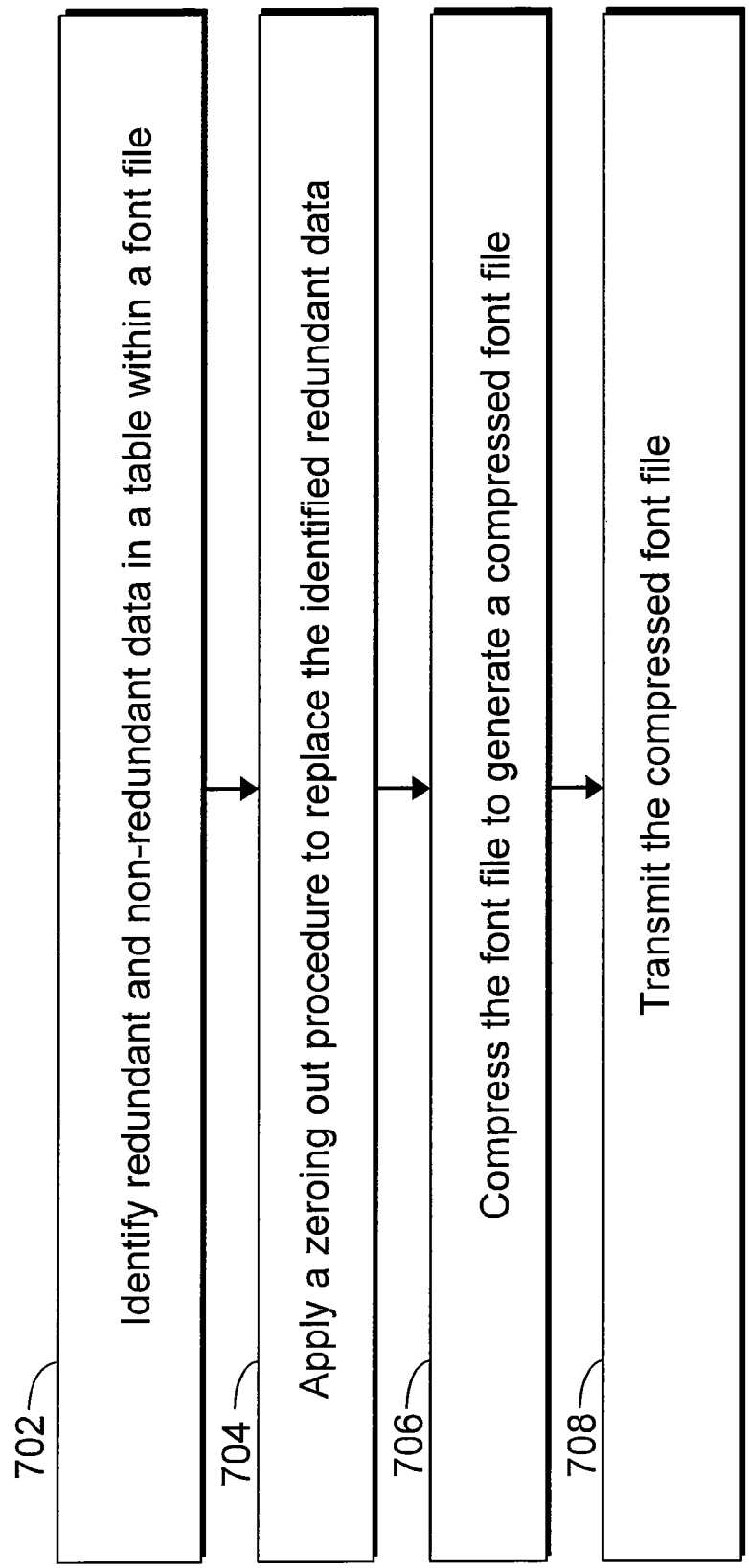
FIG. 7 is a flowchart depicting a method of transmitting a compressed font file in accordance with an embodiment.

Steps performed by font service 104 to transmit the requested font file are described using FIG. 7. FIG. 7 is a flowchart depicting a method of transmitting a compressed font file in accordance with an embodiment. At step 702, redundant and non-redundant data are identified in a table within a font file. Prior to compression of font file 210, font service 104 identifies redundant data (for example, 602-A) and non-redundant data (for example, 603-A) within a table (for example, $1^{st}$ table 601-A).

Figure 9:
FIG. 9 shows decompressed data in accordance with an embodiment.

At step 704, a zeroing out procedure is applied to replace the identified redundant data. Font service 104 performs a zeroing out procedure and replaces identified redundant data 602-A within $1^{st}$ table 601-A. In accordance with an embodiment, selected types of redundant data are replaced by respective patterns of zeroes. For example, a loca table may be replaced by a first predetermined number of zeroes, a bounding box may be replaced by a second predetermined number of zeroes, etc. Suppose that redundant data 602-A includes loca table 604, depicted by FIG. 6B. Data representing loca table 604, which is the identified redundant data, is replaced with data arranged in a predetermined pattern. The predetermined pattern of invalid data may include a predetermined number of zeroes. In one embodiment, the identified redundant data is replaced with a predetermined number of $2^4$ zeroes or "0000000000000000", which corresponds to a particular element of font file 210. An example of redundant data that has been zeroed out is shown in FIG. 9. In one embodiment, predetermined pattern of invalid data 906 may correspond to loca table 604 depicted by FIG. 6B. In another embodiment, redundant data 602 may also include at least one bounding box 605 associated with a glyph in at least one of a plurality of tables in font file 210.

At step 706, the font file is compressed to generate a compressed font file. Font service 104 applies an entropy encoder algorithm to compress font file 210. The entropy encoder algorithm may be any one of a plurality of entropy encoder algorithms. Methods of selection of an entropy encoder algorithm are described herein. In an embodiment, the zeroing out procedure is performed prior to compression.

At step 708, the compressed font file is transmitted. Font service 104 transmits the compressed font file to user device 106, via network 102. User device 106 may cache or store the compressed font file (for example, in memory 306). User device 106 subsequently uses the font file to display webpage 510.

In an embodiment, the zeroing out procedure may advantageously cause the compression efficiency to improve, yielding a smaller compressed font file.

In an embodiment, suppose 8 bytes of zeroes are provided beginning at offset: 2. This arrangement may represent a bounding box. However, 8 bytes of zeroes in another location may correspond to another item. Therefore, the location of the redundant data may be used to determine a type of redundant data. In particular, other data within the font file is used to determine the location within the font file of the bounding box data for a particular glyph.

Redundant data 602-A includes be any type of redundant data described above. For example, in another embodiment, redundant data 602-A may be a bounding box associated with a glyph in a glyph table. Font service 104 accordingly replaces the bounding box with a second predetermined pattern of data associated with a bounding box. For example, font service 104 may replace the bounding box with a second predetermined number of zeros, and then font file 210 is compressed. Font service 104 compresses font file 210 and transmits the compressed font file to user device 106.

In an embodiment, a set of rules includes steps for compressing a font file and for reconstructing the compressed font file. For example, the set of rules may indicate that if a pattern including $2^4$ zeroes is associated with a loca table, then at the reconstruction phase, $2^4$ zeroes are replaced by a loca table. In an embodiment, both the compressor and decompressor, of font service 104 and user device 106, respectively, agree to the set of rules. The compressor runs the set of rules on a font file, and if redundant data (e.g. a loca table) is identified, the zeroing out procedure is performed. In an embodiment, the compressor may run the set of rules and perform the zeroing out procedure prior to compression. In an alternate embodiment, another device may run the set of rules prior to compression. In an embodiment, all data in a font file is analyzed to determine if the set of rules can be applied to any portion of the font file.

Decompression

Figure 8:
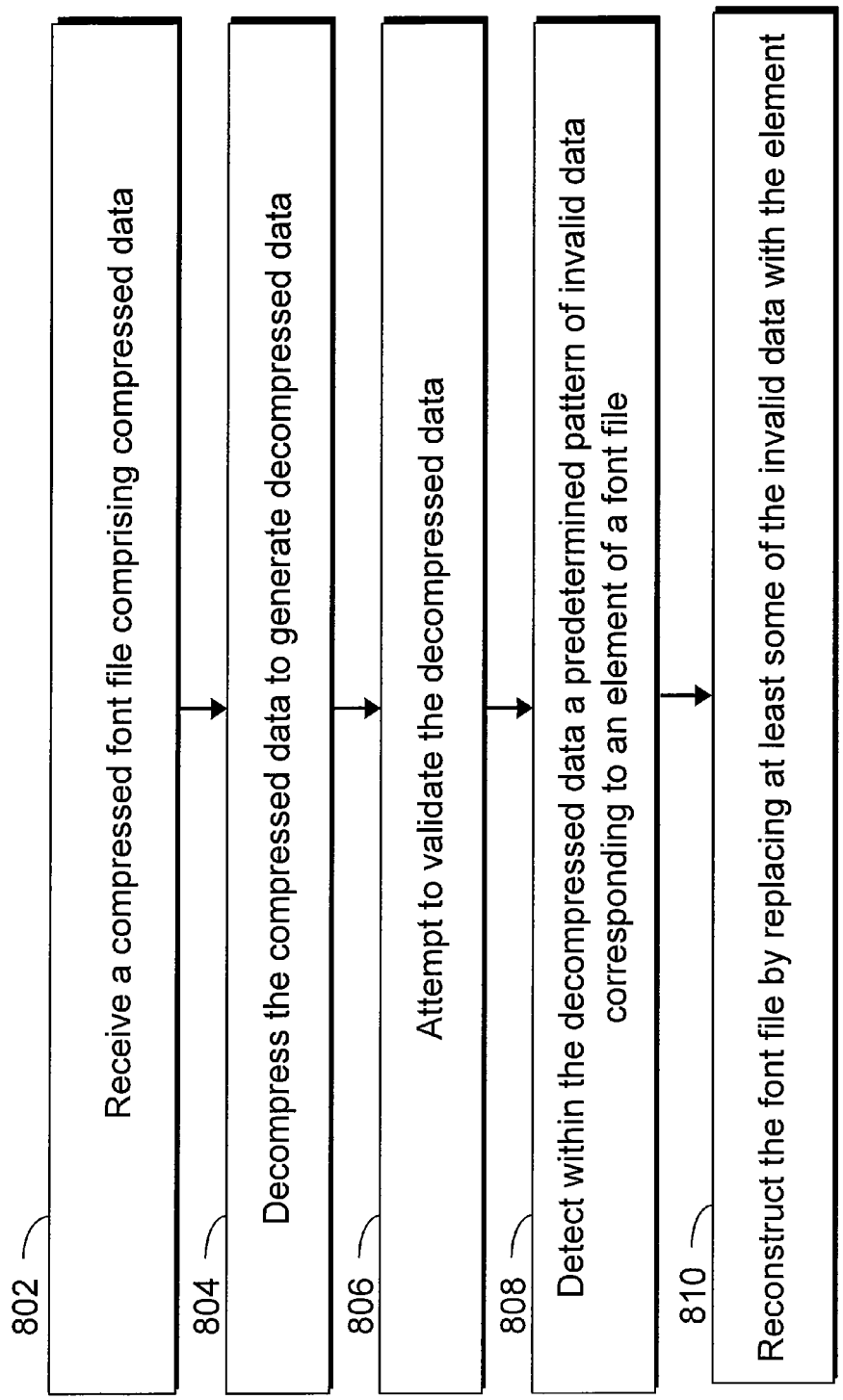
FIG. 8 is a flowchart depicting a method of reconstructing a compressed font file in accordance with an embodiment.

The compressed font file is received at user device 106 and reconstructed, as described in the flowchart of FIG. 8. FIG. 8 is a flowchart depicting a method of reconstructing a compressed font file in accordance with an embodiment. At step 802, a compressed font file comprising compressed data is received. The compressed font file, containing font file 210, is received at user device 106, via network 102.

At step 804, the compressed data is decompressed to generate decompressed data. Compressed font file 210 including compressed data is decompressed, for example by user device 106, to generate decompressed data. User device 106, using a decompression technique, transforms the compressed data into decompressed data 902, shown in FIG. 9. In accordance with an embodiment, the decompression step is a decompression step of an entropy coder.

At step 806, an attempt is made to validate the decompressed data. User device 106 interprets decompressed data 902 in order to validate the decompressed data. In the illustrative embodiment of FIG. 9, user device 106 determines that data 904 includes valid decompressed data. When attempting to validate decompressed data 902, invalid data (along with valid data) is detected, as described further in step 808.

At step 808, within the decompressed data a predetermined pattern of invalid data corresponding to an element of a font file is detected. Within decompressed data 902, user device 106 detects a predetermined pattern of invalid data 906 corresponding to an element of font file 210. In the illustrative embodiment of FIG. 9, a predetermined pattern of "0000000000000000" corresponds to a particular element of font file 210. For example, predetermined pattern of invalid data 906 may correspond to redundant data 602. In an embodiment, invalid data 906 is indicative of loca table 604 depicted by FIG. 6B, for example. In an embodiment, a lint tool in user device 106 may check whether the decompressed data 902 is valid or has been zeroed out. If it is determined that decompressed data 902 is not valid and has been zeroed out, the data is reconstructed, as described at step 810.

In an embodiment, redundant data may be associated with an element of a font file. In an embodiment, the element includes at least one of bounding box 605 associated with a glyph in the font file; and loca table 604. Other examples of elements include redundancy in the name table; redundancy in some flags and metadata; redundancy in cmap tables; redundancy in the post table; data in kern table; and glyph references in composite characters.

In an embodiment, the element includes loca table 604 wherein the loca table includes an indication of a start position of an entry within the loca table. The loca table is derived by scanning through a glyph table.

In accordance with an embodiment, a font, (e.g. an OpenType font or more generally, one in the spline font (SFNT) container format) may include a collection of tables. Each table may have a 4-byte tag, and contents (e.g. a sequence of bytes). Each table may contain a different aspect of the font. For example, the glyph table may contain outline data for the glyphs in the font, while the cmap table may contain character map information.

Figure 10:
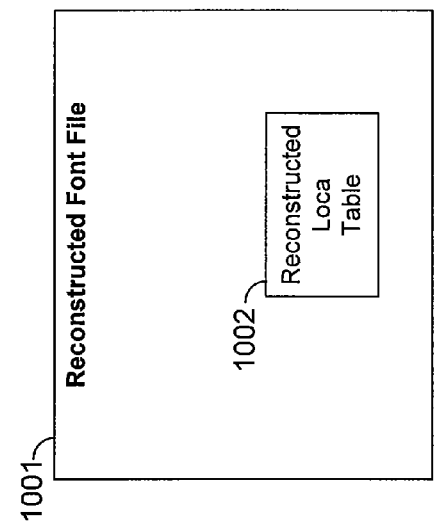
FIG. 10 shows a reconstructed font file in accordance with an embodiment.

At step 810, the font file is reconstructed by replacing at least some of the invalid element. In the illustrative embodiment of FIGS. 9-10, user device 106 may generate reconstructed font file 1001 by replacing at least some of invalid data 906 with the associated element (e.g. loca table) generating reconstructed loca table 1002. In an embodiment, reconstruction may be performed using agreed-on heuristics. In an embodiment, ensuring the decompressed font file's validity may occur during the reconstruction step.

In an embodiment, when reconstructing the compressed font file (e.g. at user device 106), user device 106 may perform a consistency check. If a data field is not valid (because it has been zeroed out), user device 106 may use an algorithm to reconstruct any missing data, while ensuring that it is consistent with other data in the font file. If data is not redundant, then the non-redundant data is transmitted without having a zeroed out procedure applied thereto.

Redundant Data in Name Table

In an embodiment, entries in a name table of a font file may be redundant. Various family names, some of which may be derived from a base name and other information in the font, such as weight, may include redundant data. In addition, some font files may have multiple redundant tables for encoding weight, vertical metrics, etc. The name table may be present with various types of OS encoding. In addition, a format 4 cmap table is required for conformance with the OpenType specification even when the data in the format 4 cmap table is redundant with another cmap table. For example, the font may contain a format 12 cmap table for extended Unicode coverage.

When applying a procedure (e.g. zeroing out procedure) to data, if the data is not actually redundant (for example, if the weight-variant name is unusual), then the data is preserved, rather than having a procedure applied to it (e.g. being zeroed out).

For example, suppose that a name of a font is unusual and properties of the font may not be inferable by the family name and weight. The font name may be "Fonty Fett" and there is no indication in the font name of the properties of the font weight, etc. "Fonty Fett" may have a family name of "Fonty" and a weight code of "700" ("Bold"). In this embodiment, the font name does not contain redundant data, and therefore, no portion of the font name is zeroed out.

When a font file corresponding to the "Fonty Fett" font is reconstructed, it results in a valid font that may be used on all contexts where the font is accepted. For example, the font may be accepted in OS rendering stacks, embedding into portable formatted files or other file formats, etc. In the implementation of decompressing by user device 106, the decompression may be applied in a single operation on the (redundant and non-redundant) data, after the data comes back from the font request, but prior to using the font for layout, rendering, etc. In the illustrative embodiment of FIG. 5, font file 210 is used to render text on website 510.

In an embodiment, the zeroing out procedure may be beneficial because the reconstructed font may have a higher degree of confidence of being consistent and valid. In an embodiment, the zeroing out procedure may not be used to compress an arbitrary byte sequence, but only a valid font. Therefore, the zeroing out procedure may only be used on a valid font thus, minimizing security risks.

By using the zeroing out procedure, redundant data taking up space in font files is reduced or eliminated. This further reduces delay in transmission of the font file. Furthermore, by using the zeroing out procedure, security risks associated with invalid or malicious data disguised as invalid fonts are minimized.

Other Embodiments

In other embodiments, an explicit command may be transmitted to and received by a user device requesting a font file. For example, when redundant data (e.g. a loca table) has been identified, instead of applying a zeroing out procedure, an explicit command that says, for example, "loca table has been removed" may be used.

In yet another embodiment, a new font format may be defined from scratch; where the new font format does not have the same sources of redundancy that existing font formats have. As such, it may be possible to obtain a font compatible with existing fonts and formats.

In other embodiments, a combination of procedures may be applied to redundant data in a font file. These procedures may be applied by any device (e.g. a device utilizing a browser) or any device serving font files. Moreover, these procedures may be applied by a local machine, such as user device 106, which stores font files.

In an embodiment, compression of the font file may be transparent and lossless, (i.e. the reconstituted font file should be functionally equivalent to the original). For example, reconstructed loca table 1002 may be equivalent to or substantially similar to loca table 604. In an embodiment, by applying a procedure, such as the zeroing out procedure, to the font file prior to compression of the font file, the size of the compressed font file is reduced. Thus, speed of delivery of the font file to a user device may be improved, delays may be reduced and overall efficiency may be enhanced.

In accordance with an embodiment, the font format of the font files is backwards compatible. For example, backward compatibility may apply to fonts used by facsimile machines, printers, etc.

Selectable Entropy Encoding

A font file may include multiple tables (e.g. glyph table, kern table, cmap table, etc.). In accordance with an embodiment, for each of the different tables, a suitable entropy encoder may be chosen and used to encode the table. If, for example, the font file includes twelve tables, it is possible that a different entropy encoder may be chosen for each table. In an embodiment, it may be determined that the same entropy encoder is applicable to and is best suited for more than one of the tables. In another embodiment, it may be determined that no entropy encoder is needed for one (or more) of the tables.

Figure 11:
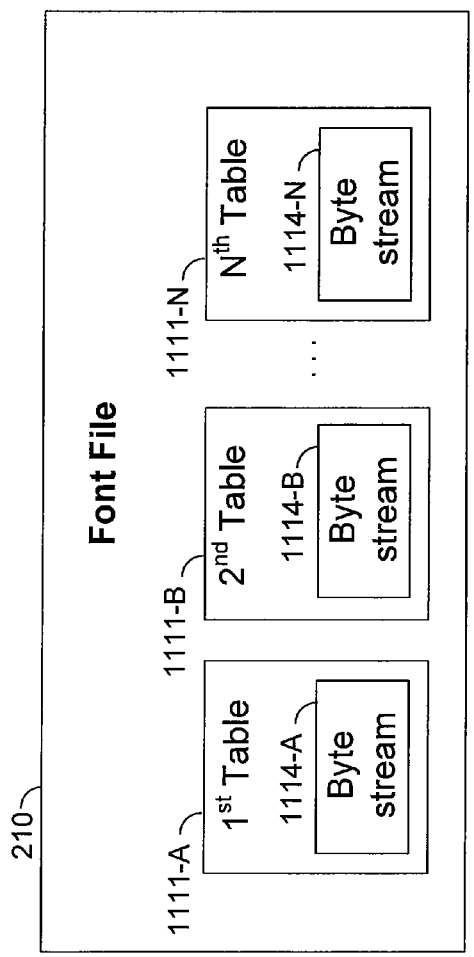
FIG. 11 shows an exemplary font file having a plurality of font tables in accordance with an embodiment.
Figure 12:
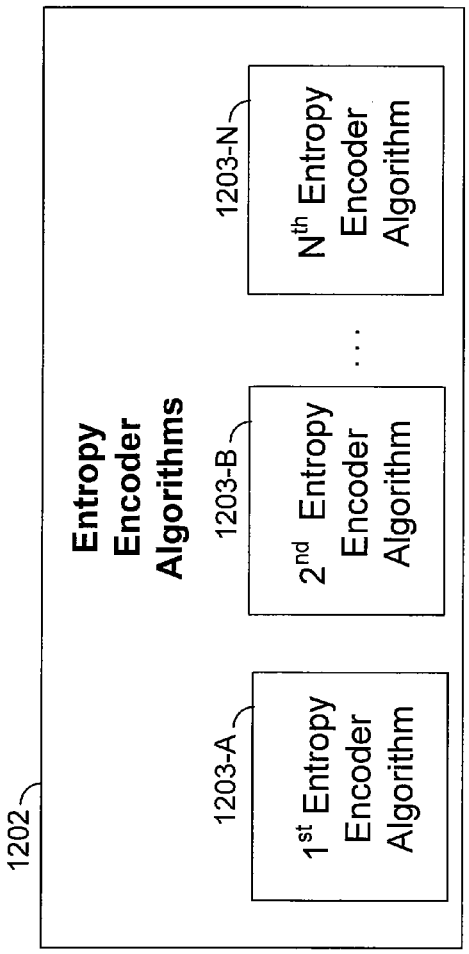
FIG. 12 shows a plurality of entropy encoder algorithms in accordance with an embodiment.

In accordance with an embodiment illustrated in FIG. 11, font file 210 includes a plurality of tables 1111-A, 1111-B, . . . , 1111-N. $1^{st}$ table (1111-A), $2^{nd}$ table (1111-B) and $N^{th}$ table (1111-N) are hereinafter referred to collectively as tables 1111. FIG. 12 shows a plurality of entropy encoder algorithms that are available for use in encoding font tables. FIGS. 11 and 12 will be described herein with respect to the steps described in the flowchart of FIG. 13.

Figure 13:
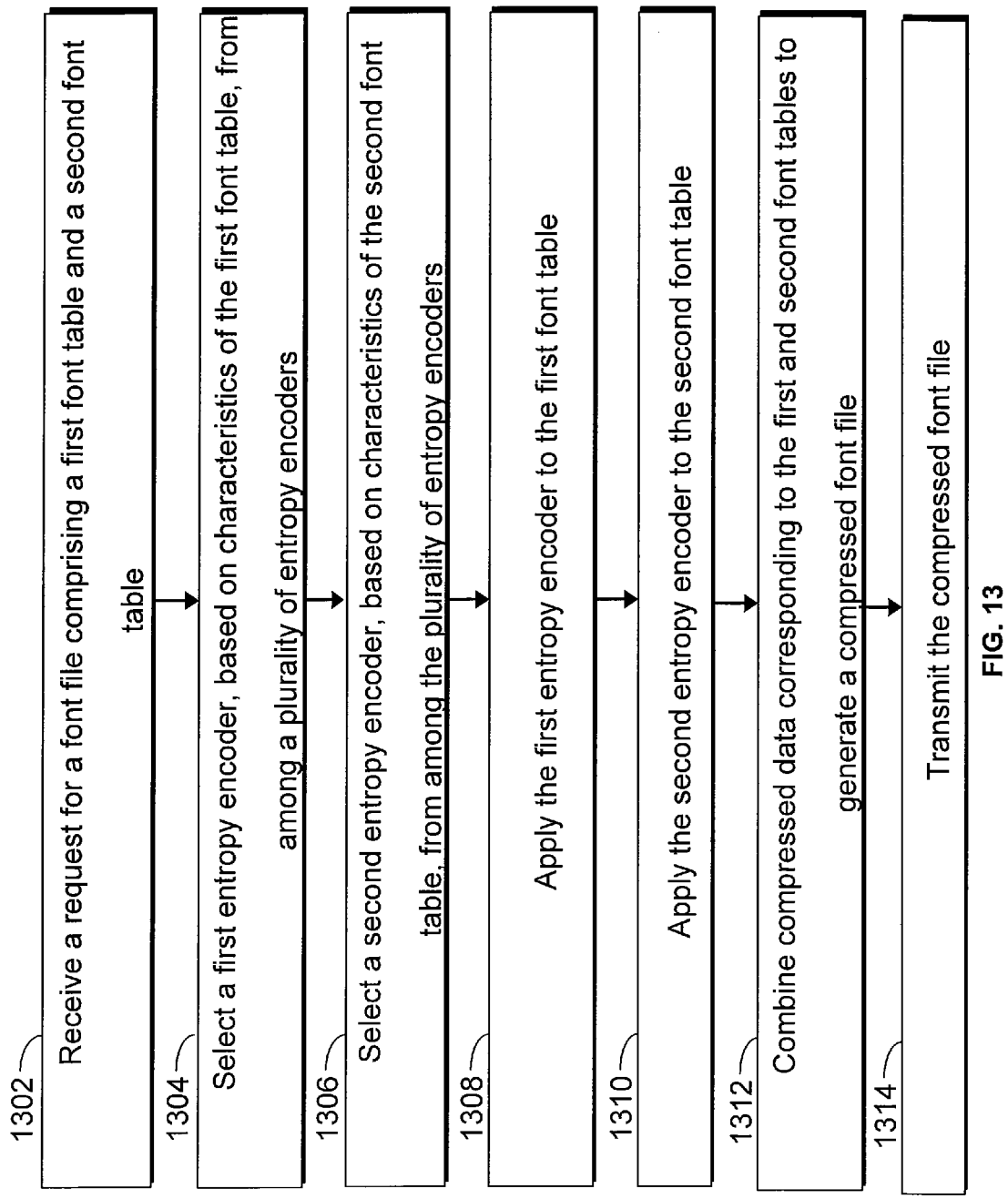
FIG. 13 is a flowchart depicting a method of applying entropy encoder algorithms in accordance with an embodiment.

FIG. 13 is a flowchart depicting a method of applying entropy encoder algorithms in accordance with an embodiment.

At step 1302, a request is received for a font file comprising a first font table and a second font table. In the illustrative embodiment of FIGS. 1 and 11, font service 104 receives a request for font file 210 including first font table 1111-A and second font table 1111-B. The request may be initiated by user device 106 and sent via network 102.

At step 1304, a first entropy encoder is selected based on characteristics of the first font table, from among a plurality of entropy encoder algorithms. Referring to FIG. 12, $1^{st}$ entropy encoder algorithm 1203-A is selected from among other entropy encoder algorithms (e.g. $2^{nd}$ entropy encoder algorithm 1203-B, ..., $N^{th}$ entropy encoder algorithm 1203-N) based on one or more characteristics of $1^{st}$ font table 1111-A. According to an embodiment, each table in font file 210 may have different characteristics.

At step 1306, a second entropy encoder is selected based on characteristics of the second font table, from among the plurality of entropy encoder algorithms $2^{nd}$ entropy encoder algorithm 1203-B is selected from among other entropy encoder algorithms (e.g. $1^{st}$ entropy encoder algorithm 1203-A, ..., $N^{th}$ entropy encoder algorithm 1203-N) based on one or more characteristics of $2^{nd}$ font table 1111-B. Font service 104 may perform the selection, as described herein. $2^{nd}$ entropy encoder algorithm 1203-B is different from $1^{st}$ entropy encoder 1203-A.

In an embodiment, prior to compression of font file 210, trials or tests may be conducted to determine which entropy encoder algorithm is best suited for each of the plurality of tables 1111. Font service 104 may use a variety of heuristics or criteria to determine which entropy encoder algorithm to use during the trials. These criteria may include various categorizes including time to compress, network latency and time to decompress. For each table, an algorithm may be selected that optimizes one or more of the categories of criteria. In an embodiment, all available entropy encoder algorithms 1202 in FIG. 12 may be applied to the each of the plurality of tables 1111 in font file 210 and the best entropy encoder algorithm is chosen for each of the font tables. In another embodiment, characteristics of a selected font table may be used to determine and narrow down which entropy encoder algorithm(s) is/are best suited. For example, it may be determined that for $1^{st}$ table (1111-A), $1^{st}$ entropy encoder algorithm (1203-A) is best suited based on characteristics of $1^{st}$ table (1111-A); and for $2^{nd}$ table (1111-B), $2^{nd}$ entropy encoder algorithm (1203-B) is best suited based on characteristics of $2^{nd}$ table (1111-B). Similarly, for each remaining font table, a respective entropy encoder algorithm may be selected.

In an embodiment, characteristics of a font table also may be used to determine which entropy encoder algorithm is optimal. These characteristics may include at least one of the following: an original size of the font table; a size of the font table after applying an entropy encoder during the test; a type of the first font table; one or more changes in content of the first font table; and an importance of the first font table. The type of the font table may include one of: a glyph table; a cmap table; a kern table; a loca table; and a name table. The font table may include the loca table and the loca table may include an indication of a start position of an entry within the loca table.

For example, to minimize the font size, a trial compression may be performed with each of, some, or all available entropy encoder algorithms. Then, an optimal entropy encoder algorithm may be chosen (e.g. one resulting in the smallest compressed size). As described, that process would be done once for each table in the font. Font service 104, when compressing a font, may decide which entropy encoder algorithm to use.

At step 1308, the first entropy encoder is applied to the first font table. $1^{st}$ entropy encoder algorithm 1203-A is applied to $1^{st}$ font table 1111-A by font service 104, generating first compressed data.

At step 1310, the second entropy encoder is applied to the second font table. $2^{nd}$ entropy encoder algorithm 1203-B is applied to $2^{nd}$ font table 1111-B by font service 104, generating second compressed data.

Accordingly, when a request is received for font file 210, for each font table in the font file, an entropy encoder algorithm is selected and applied thereto. Each table may be compressed with a different low-level entropy encoder algorithm.

At step 1312, compressed data corresponding to the first and second font tables are combined to generate a compressed font file. Compressed data corresponding to $1^{st}$ font 1111-A table and $2^{nd}$ font table 1111-B are combined to generate a compressed font file by font service 104.

At step 1314, the compressed font file is transmitted. The compressed font file is transmitted from font service 104 to user device 106, via network 102. In an embodiment, if the request for the font file at step 1302 is a request for a webfont file, the webfont may be stored on font service 104 and a compressed webfont file may be transmitted to user device 106 over network 102 using a web protocol (e.g. Hypertext Transfer Protocol (HTTP)) when the user device 106 makes a request. User device 106 receives and decompresses the compressed font file, and uses the font file to display text.

Figure 14:
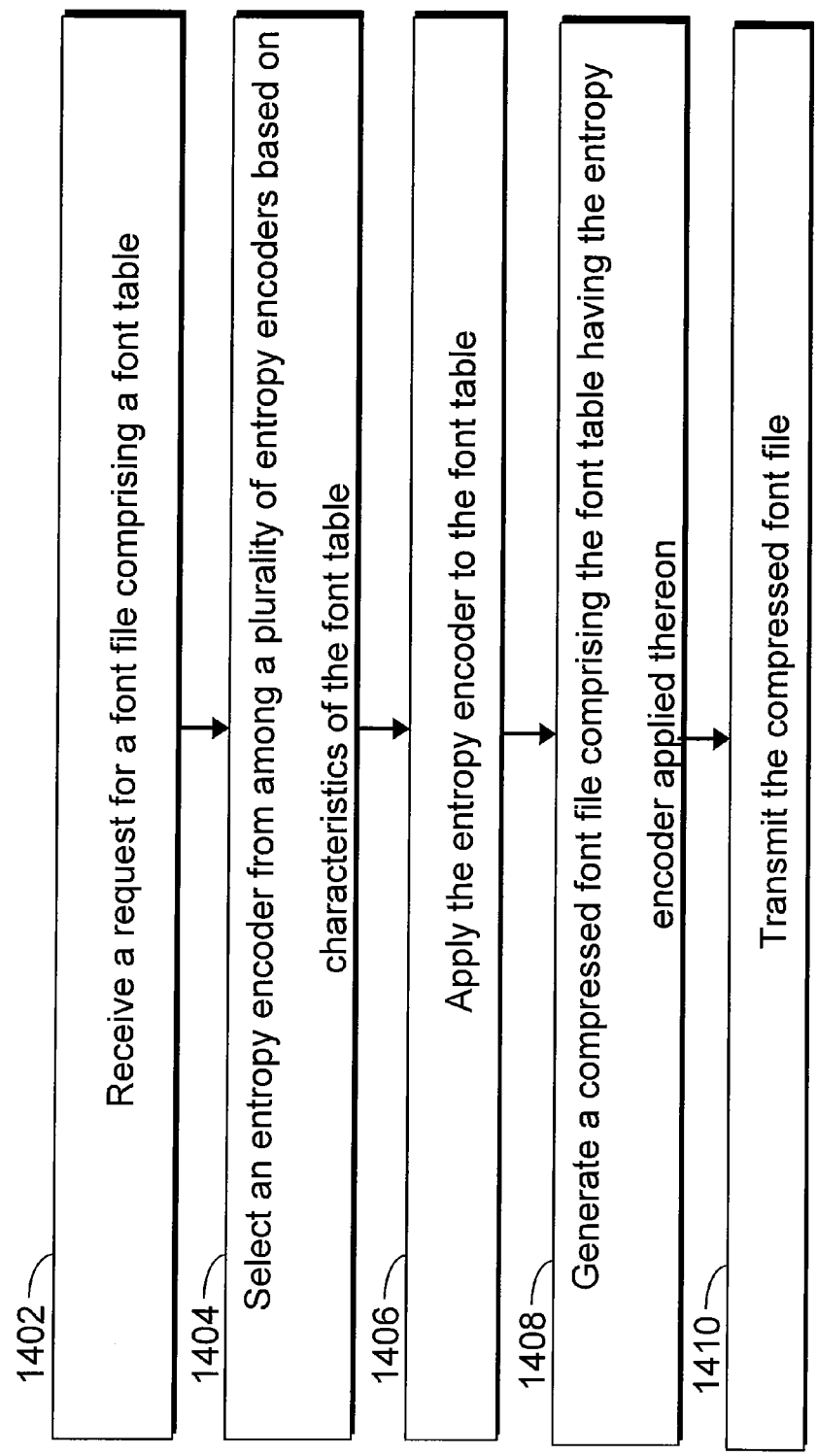
FIG. 14 is a flowchart depicting a method of applying an entropy encoder algorithm in accordance with an embodiment.

FIG. 14 is a flowchart depicting a method of applying an entropy encoder algorithm in accordance with an embodiment.

At step 1402, a request is received for a font file comprising a font table. In the illustrative embodiment of FIGS. 1 and 11, font service 104 receives a request for font file 210 including first font table 1111-A. The request may be initiated by user device 106 and sent via network 102.

At step 1404, an entropy encoder is selected from among a plurality of entropy encoder algorithms based on characteristics of the font table. $1^{st}$ entropy encoder algorithm 1203-A is selected from among other entropy encoder algorithms (e.g. $2^{nd}$ entropy encoder algorithm 1203-B, ..., $N^{th}$ entropy encoder algorithm 1203-N) based on characteristics of $1^{st}$ font table 1111-A. According to an embodiment, each table in font file 210 may have different characteristics with respect to compression.

At step 1406, the entropy encoder is applied to the font table. $1^{st}$ entropy encoder algorithm 1203-A is applied to $1^{st}$ font table 1111-A by font service 104.

At step 1408, a compressed font file comprising the font table having the entropy encoder applied thereon is generated. A compressed font file including $1^{st}$ font table 1111-A having the $1^{st}$ encoder algorithm 1203-A applied thereon is generated by font service 104.

At step 1410, the compressed font file is transmitted. The compressed font file is transmitted from font service 104 to user device 106 via network 102. In an embodiment, if the request for the font file at step 1302 is a request for a webfont file, the webfont may be stored on font service 104 and a compressed webfont file may be transmitted to user device 106 over network 102 using a web protocol (e.g. Hypertext Transfer Protocol (HTTP)) when the user device 106 makes a request.

In order for font service 104 to choose entropy encoding algorithms to compress data contained within the font tables, font service 104 may conduct one or more tests. For example, font service 104 may apply various coding algorithms or compression algorithms to each of the font tables to determine optimal entropy encoding algorithm for each of the font tables. In an embodiment, font service 104 may apply a few or all of the entropy encoding algorithms to determine which entropy encoding algorithm is optimal for a particular font table. Additionally, font service 104 may use certain characteristics of the particular font table to narrow down and apply a subset of all of the encoding schemes. This may be repeated for all the font tables.

In accordance with an embodiment depicted by FIG. 12, the selecting of first entropy encoder algorithm 1203-A includes performing a test to compare the first entropy encoder algorithm applied to first font table 1111-A and second entropy encoder 1203-B applied to first font table 1111-A. The selecting of first entropy encoder algorithm 1203-A also includes determining first entropy encoder 1203-A as an optimal encoder for first font table 1111-A based on the test.

In an embodiment, the test may indicate that applying first entropy encoder algorithm 1203-A to first font table 1111-A provides a reduction in size of first font table 1111-A. It may also be determined by the test that first entropy encoder algorithm 1203-A may provide the greatest reduction in size or may have additional benefits when applied to first font table 1111-A over other entropy encoder algorithms.

Exemplary Coding Schemes

According to an embodiment, some tables may be combined into a single compression stream, resulting in reduction of overhead of setting up a separate low-level compressor for each table. A two level table structure may be used to implement the single compression stream. The first level table may be a sequence of compressed streams, each identifying the entropy encoder algorithm used. The second level table may include an entry for each table in the font, each consisting of a tag, an identifier of which compressed stream to use, an offset into that stream, and a length.

Some other encoding schemes that may be used include:
Lempel-Ziv-Markov chain Algorithm (LZMA) algorithm
GNU zip (gzip) Burrows-Wheeler algorithm (bzip) and bzip2
Burrows-Wheeler algorithm (bzip) and bzip2
Shared Dictionary Compression over HTTP (SDCH)

Sorting for Optimal Compression

In an embodiment, effectiveness of compression may be dependent on the order that data or objects appear within the compression stream. A sort to the data may be applied to make compression optimal (e.g. tables within font, glyphs within font). Glyphs may be reordered without affecting the appearance of a font, but a number of tables may need to be renumbered to compensate. As an illustrative example, better compression may occur if glyphs with curves are grouped together with each other, and glyphs with straight sections are also grouped with each other. Thus, a more optimized glyph order may be "AEFHIJKLMNTVWXYZBCDGOPQRSU". If in the original font, the glyphs are numbered A=1, B=2, C=3, D=4, E=5, etc., then in the more optimized font, the glyphs would be renumbered A=1, B=17, C=18, D=19, E=2, etc. All tables in the new font which refer to individual glyphs must be renumbered, so that in such tables a reference to glyph 2 (B) in the original font would become a reference to glyph 17 in the optimized fonts. Examples of such tables include cmap (character map), GSUB (glyph substitution) and GPOS (glyph positioning).

No Encoding

In accordance with an embodiment, font service 104, in response to receiving a request for font file 210 including a third font table (i.e. 1111-N), may determine that no compression algorithms or entropy encoder algorithms 1202 should be applied to encode third font table 1111-N. For example, none of the entropy encoding algorithms may be optimal for third font table 1111-N. Additionally, font service 104 may determine, by performing one of more tests, that if any one of the entropy encoding algorithms were to be applied to data including third font table 1111-N, the resulting compressed data would be greater, equivalent to, or slightly lesser in size than the original, uncompressed data. Such a condition may occur, for example, if the data contained within third font table 1111-N is small and compressing the data may not save much space or it may not be worthwhile in terms of time and cost to compress the data. Further, third table 1111-N may evolve overtime and although it was worthwhile compressing the data contained within using an encoding algorithm in the past, it may be determined by font service 104 that in view of the evolved table, it may no longer be worthwhile to compress the data. Thus, font service 104 determines that no entropy encoding is to be applied to third font table 1111-N.

Decompression

Compressed font file 210 including compressed data is decompressed, for example by user device 106, to generate decompressed data. User device 106, using a decompression technique (matched to the compression technique used to compress the data), transforms the compressed data into decompressed data. The user device selects an entropy coding technique for the decompression based on selection data stored in the compressed font. Because different entropy coding techniques may be optimal for different tables within the font, in accordance with an embodiment, the user device selects an entropy coding technique for each table, based on a plurality of selection data entries in the font.

In an embodiment, because decompression may take time and central processing unit (CPU) load (e.g. for more advanced entropy encoder algorithms that achieve higher compression ratios), user device 106 may store an uncompressed version of the font file in local cache. For example, should user device 106 be accessing a website hosted by website provider 108 (by selecting, accessing, and/or clicking on and/or typing the website name into browser 302), user device 106 may store an uncompressed version of the font file used to render text contained on the website in local cache (e.g. memory 306) in order to reduce time. Thus, on initial use, total time may be optimized because the network latency may be minimized, and on subsequent uses from the cache, total time may be optimized because the font file will already have been uncompressed.

The font files may be compressed on the server side, and the font files may be decompressed in a browser. This may be used, for example, by mobile phones and/or mobile browsers, either in the platform or in an application such as a book reader.

The use of web fonts may enable a visually richer and semantically meaningful website than in the past, which required fonts to be pre-installed on the user system and were limited to the pre-installed fonts.

Per-Table Shared Dictionary Coding

In accordance with an embodiment, a separate flate (gzip) stream may run for each table in the font file.

Shared Dictionary Compression over HTTP (SDCH) may pre-seed the compression dictionary with strings that are likely to appear in the stream. During compression, reference is made to the strings. In an embodiment, the SDCH may be shared between font service 104 and user device 106. The SDCH may assign a portion of a string to a numerical code, for example. If the string is a phrase, the phrase may be replaced by the code "110." Both font service 104 and user device 106 using SDCH recognize that every time code "110" is used, it refers to the phrase.

Other techniques may be used in order to increase efficiency of compression. In accordance with an embodiment, a shared initial probability chart may be used for each byte stream. As illustrated in FIG. 11, each of $1^{st}$ table (1111-A), $2^{nd}$ table (1111-B) and $N^{th}$ table (1111-N) include respective byte streams 1114-A, 1114-B and 1114-N. Predetermined calculations are made based on characteristics of byte streams 1114-A, 1114-B and 1114-N. Each of the byte streams may include data. The data may be represented in any form. In an embodiment, the byte streams comprise a plurality of digits and wherein the plurality of digits are be represented by a binary number system. Thus, the byte stream may include a plurality of digits.

Figure 15:
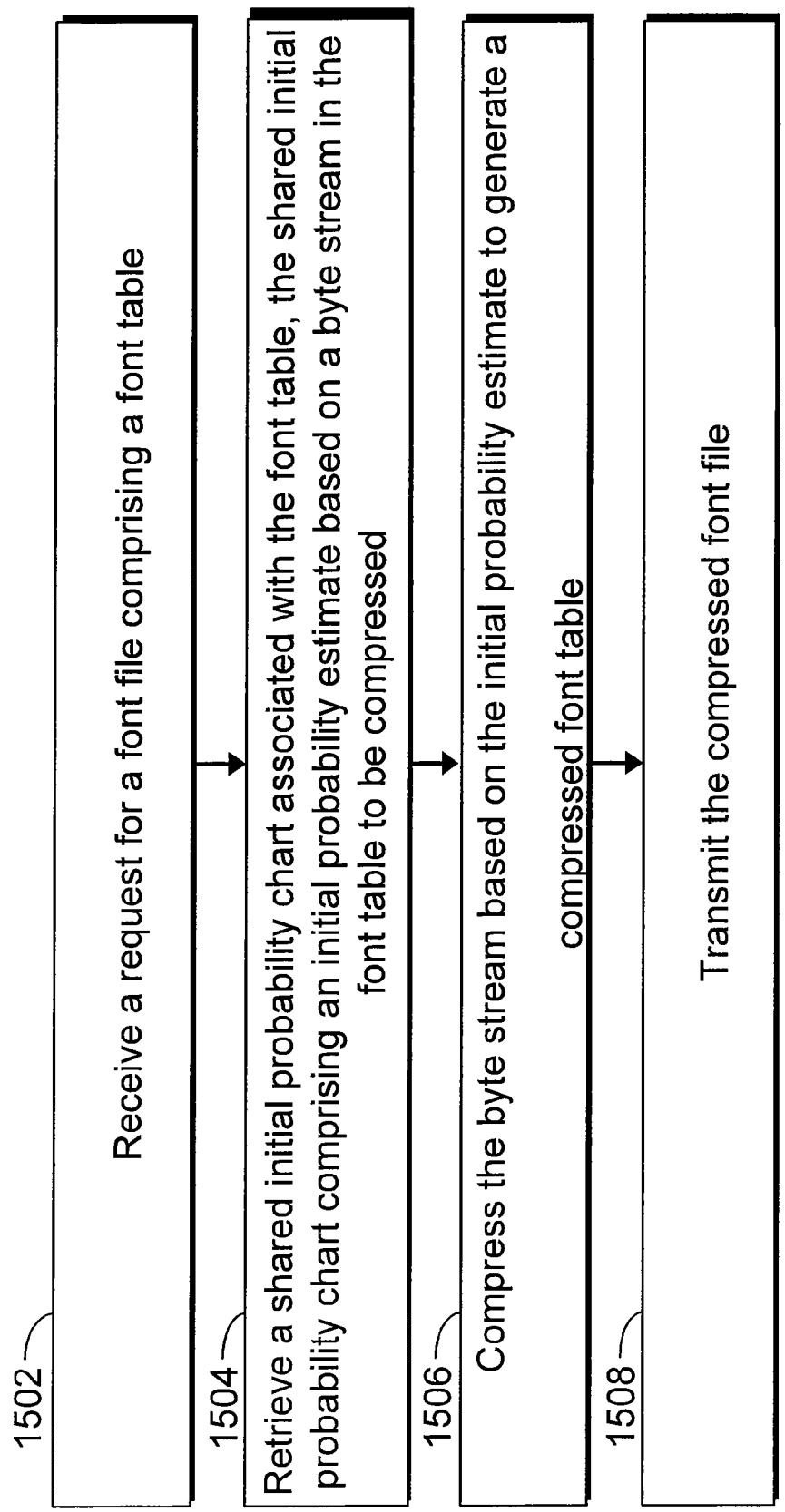
FIG. 15 is a flowchart depicting a method of compressing a font file using an arithmetic coding scheme in accordance with an embodiment.

FIG. 15 is a flowchart depicting a method of compressing a font file using an arithmetic coding scheme in accordance with an embodiment. The flowchart of FIG. 15 will be described herein with reference to FIGS. 11 and 16.

Figure 16:
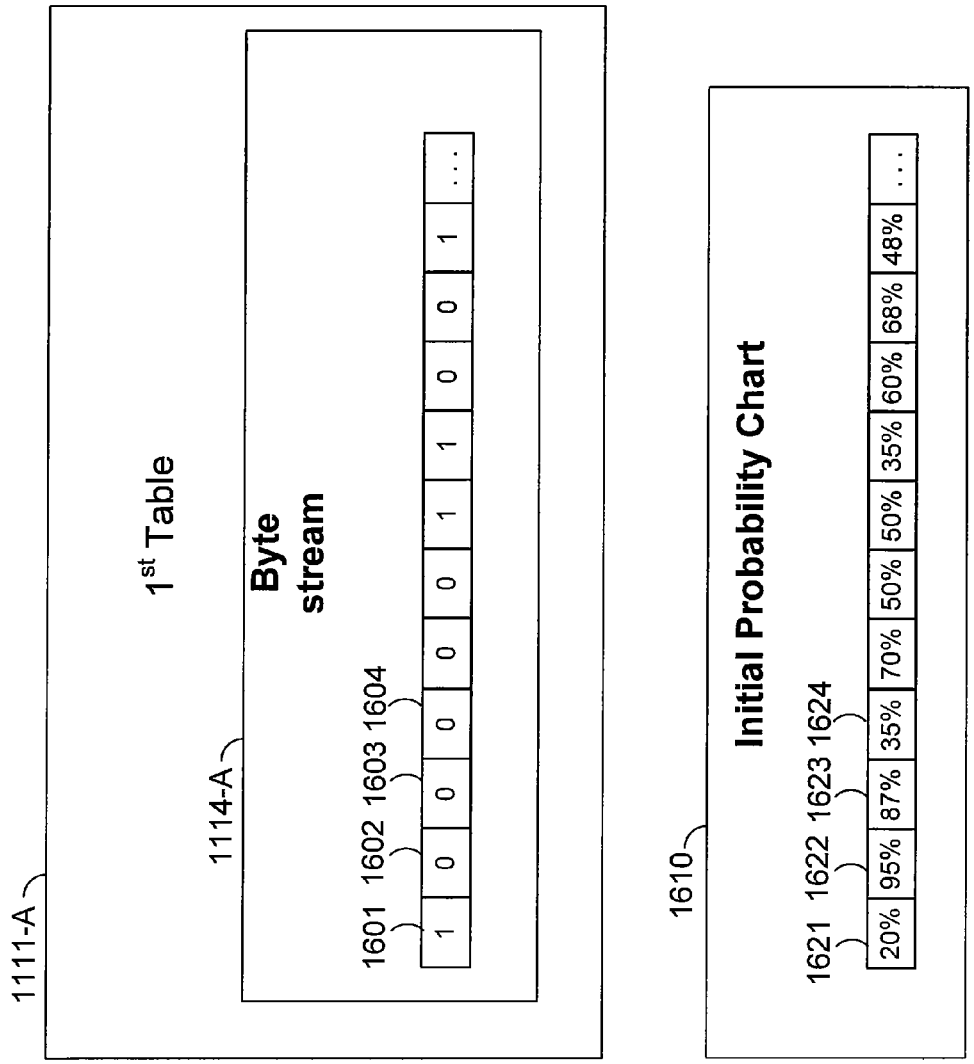
FIG. 16 shows a byte stream and an initial probability chart in accordance with an embodiment.

At step 1502, a request for a font file comprising a font table is received. A request sent from user device 106, via network 102, for font file 210 is received at font service 104. Font file 210 includes $1^{st}$ table 1111-A which includes byte stream 1114-A, as depicted by FIGS. 11 and 16. In an embodiment depicted by FIG. 16, byte stream 1114-A may include certain patterns of digits (1601, 1602, 1603 and 1604).

At step 1504, a shared initial probability chart associated with the font table is retrieved where the shared initial probability chart includes an initial probability estimate based on a byte stream in the font table to be compressed. A shared initial probability chart 1610 associated with $1^{st}$ font table 1111-A is retrieved by font service 104. Shared initial probability chart 1610 includes an initial probability estimate 1621 based on byte stream 1114-A in font table 210 to be compressed. The shared initial probability chart (or pre-seeded probability chart) is used prior to compression, for example, in order to increase efficiency of compression.

Pre-Seeded Probability Charts for Arithmetic Encoding and Compression

Initial probability charts or pre-seeded probability charts used for arithmetic encoding and compression is an encoding scheme that may be a variant of SDCH. In an embodiment, when beginning compression of each stream (for example, each of tables 1111), the probability tables for the range coder are initialized to values that have been empirically determined (e.g. by an analysis of a corpus of streams to compress) to be optimum. In an embodiment, the shared initial probability chart may be shared between font service 104 and user device 106. Each table in font file 210 may have a unique dictionary including a shared initial probability chart.

In an embodiment, a shared initial probability chart includes an initial probability estimate that may be derived by analyzing the probabilities associated with 0 and 1 bits within the byte stream to be compressed. The initial probability estimate may be derived using arithmetic coding.

Arithmetic Encoding

Certain patterns may be likely to appear in byte stream 1114-A. For example, when byte stream 1114-A is represented by the binary number system, there may be a certain pattern of 0's and 1's contained in the byte stream. Thus, there is a probability associated with each of the digits contained in the byte stream. For example, there is a probability that digit or a bit will be 1 and a probability that the bit will be 0. The probability of digits associated with the byte stream is referred to as an initial probability estimate. As depicted by FIG. 16, in initial probability chart 1610, there is an initial probability estimate 1621 (e.g. a 20% probability that the digit will be a "0") associated with a first digit 1601 in byte stream 1114-A. Additionally, this indicates that there is an 80% probability that the digit will be a "1." Alternatively, this initial probably estimate may indicate a probability of the digit being a "1" or may include both the probability of the digit being a "0" or a "1." In another embodiment, where a different base (e.g. non-binary) numerical system is used, the initial probability estimate may include probabilities associated with two or more digits. A probability of one of the plurality of digits in the byte stream is adaptively calculated, as described herein.

Referring to FIG. 16, initial probability chart 1610 indicates by an initial probability estimate 1622 that a second digit 1602 in byte stream 1114-A is 95% likely to be a "0" digit. Initial probability estimate 1622 is calculated based on various factors. In an embodiment, one of the factors may be a state of the previous digit in the byte stream.

Similarly, initial probability chart 1610 indicates by an initial probability estimate 1623 that a third digit 1603 in byte stream 1114-A is 87% likely to be a "0" digit. As shown by byte stream 1114-A, the estimation is accurate.

However, the estimate may not always be accurate. Initial probability chart 1610 indicates by an initial probability estimate 1624 that a fourth digit 1604 in byte stream 1114-A is 35% likely to be a "0" digit. Therefore, it is more likely that fourth digit 1604 would be a "1" digit. However, the estimation is not accurate, as fourth digit 1604 is actually a "0" digit. After the error in estimation is determined, the arithmetic coding scheme is adjusted properly for determining the probability estimates corresponding to the following digits.

Adaptive Arithmetic Coding

In an embodiment, by analyzing byte stream 1114-A, certain patterns may be detected and used to adaptively calculate probabilities. For example, should multiple "0" digits be detected in a pattern, the coding adaptively learns that after the pattern ends, the probability of the next digit being a "1" is 0–P, where P is the probability that the next digit will be a "0." Adaptive arithmetic coding may be a priori. That is, adaptive arithmetic coding overtime estimates the probability of the next digital based on what the relative sequence of digits has been up until the current digit.

Referring back to FIG. 15, at step 1506, the byte stream is compressed based on the initial probability estimate to generate a compressed font table. Byte stream 1114-A (specifically, first digit 1601) is compressed by font service 104 based on initial probability estimate 1621 to generate a compressed font table.

Shared initial probability chart 1610 is used during the compression of $1^{st}$ font table 1111-A including byte stream 1114-A. Initial probability estimate 1621 may be based on byte stream 1114-A. In an embodiment, each table in font file 210 may be compressed in a similar manner using a shared initial probability chart corresponding to the respective table. Font service 104 and user device 106 may agree upon a shared initial probability chart to apply to each type of table. For example, there may be multiple tables in a font file and each table (e.g. a loca table, a glyph table, etc.) may use a unique initial probability chart. In an embodiment, it may be determined that all types of a certain table (e.g. all loca tables) may be use the same initial probability chart; and all glyph tables use the same initial probability chart different from the initial probability chart for other types of tables (e.g. loca tables, cmap tables, etc.).

In order to determine an optimal initial probably chart for a certain type of table, arithmetic coding may be applied to a font table (e.g. loca table). An arithmetic coding algorithm may be applied to the font table. The arithmetic coding algorithm may then be applied to the same type of font table (e.g. loca table) for different font files. An adaptive probability computation is determined for all the font tables tested and an average of all of the same types of font tables is taken. The average is then used to construct the initial probability chart. The average indicates a more accurate probability estimate, as it is a result of running the arithmetic coding algorithm on several font tables of the same type. In an embodiment, for every instance of that particular type of font table (e.g. loca table) for any font file, the initial probability chart is used. As described above, this initial probably chart is shared between font service 104 and user device 106.

Font service 104 has knowledge of the actual digits contained within a byte stream. However, user device 106 does not know the actual digits, but uses the initial probability chart to estimate the probability of the digits. Therefore, font service 104 and user device 106 agrees to an initial SDCH dictionary which contains the initial probability charts, in order to initialize the compression/decompression.

In an alternate embodiment, a new dictionary containing initial probability charts may be transmitted from font service 104 to user device 106. This may occur, for example, if an update is made and font service 104 wishes to synchronize new data and/or a new algorithm with user device 106.

In an embodiment, the shared initial probability chart for each table may be unique. After compression, the compressed font tables may then be combined to generate a compressed font file.

At step 1508, the compressed font file is transmitted. Font service 104 transmits the compressed font file to user device 106, via network 102. User device 106 may cache or store the compressed font file (for example, in memory 306).

In an embodiment, by using an initial probability estimate, compression efficiency of byte stream 1114-A is improved and the probability estimates are updated accordingly. Byte stream 1114-A is compressed based on the initial probability estimate to generate a compressed font table.

Decompression

Figure 17:
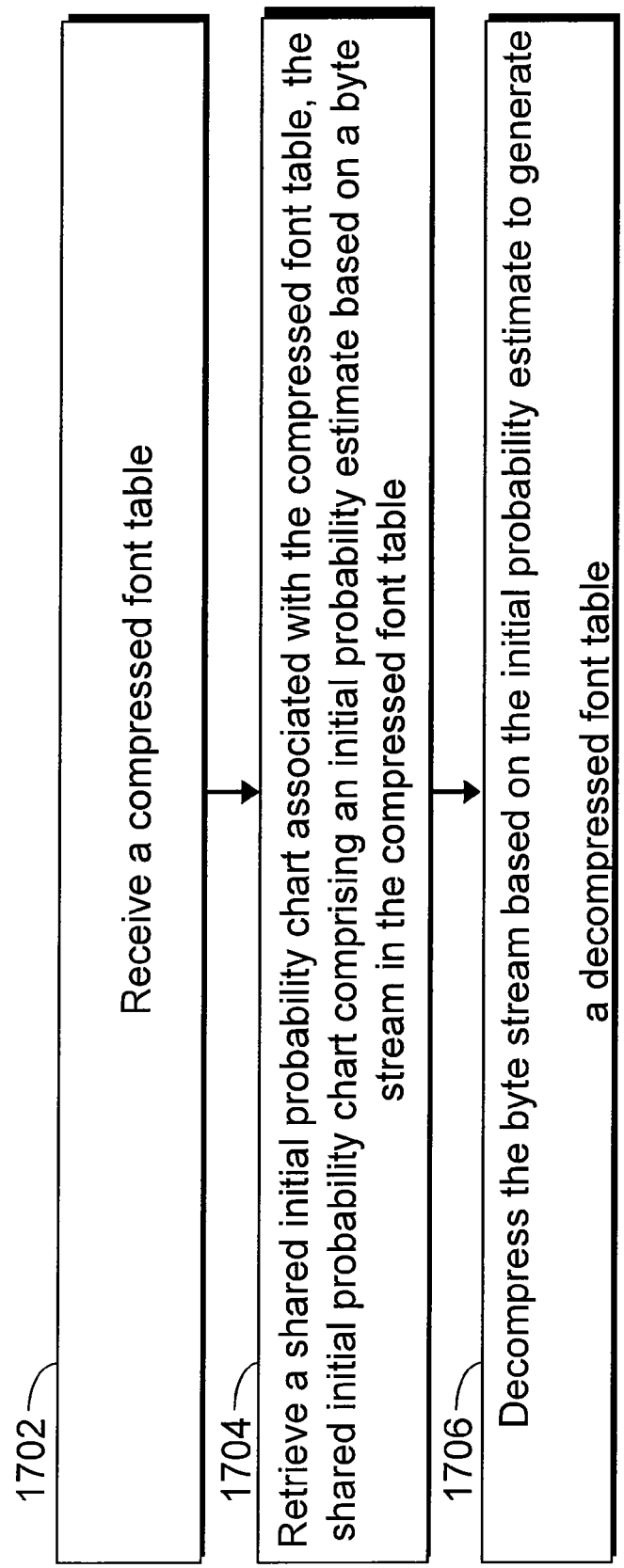
FIG. 17 is a flowchart depicting a method of decompressing a font file using an arithmetic coding scheme in accordance with an embodiment.

When user device 106 receives compressed font data having arithmetic coding applied thereto, the compressed font data is decompressed. FIG. 17 depicts a method of decompressing a font file using an arithmetic coding scheme in accordance with an embodiment.

At step 1702, a compressed font table is received. User device 106 receives the compressed font table. For example, user device 106 may receive the compressed font table after requesting font file 210, which includes a compressed version of $1^{st}$ font table 1111-A. User device 106 may request the compressed font table to provide to a user employing user device 106 a display of webpage 510, in FIG. 5. The user may wish to view text rendered using the font files containing the fonts.

At step 1704, a shared initial probability chart associated with the compressed font table is retrieved where the shared initial probability chart includes an initial probability estimate based on a byte stream in the compressed font table. Shared initial probability chart 1610 associated with compressed font table is retrieved at user device 106. The shared initial probability chart includes an initial probably estimate based on byte stream 1114-A in the first compressed font table. Shared initial probability chart 1610 may be shared between user device 106 and font service 104 and may be cached locally by user device 106.

Figure 18:
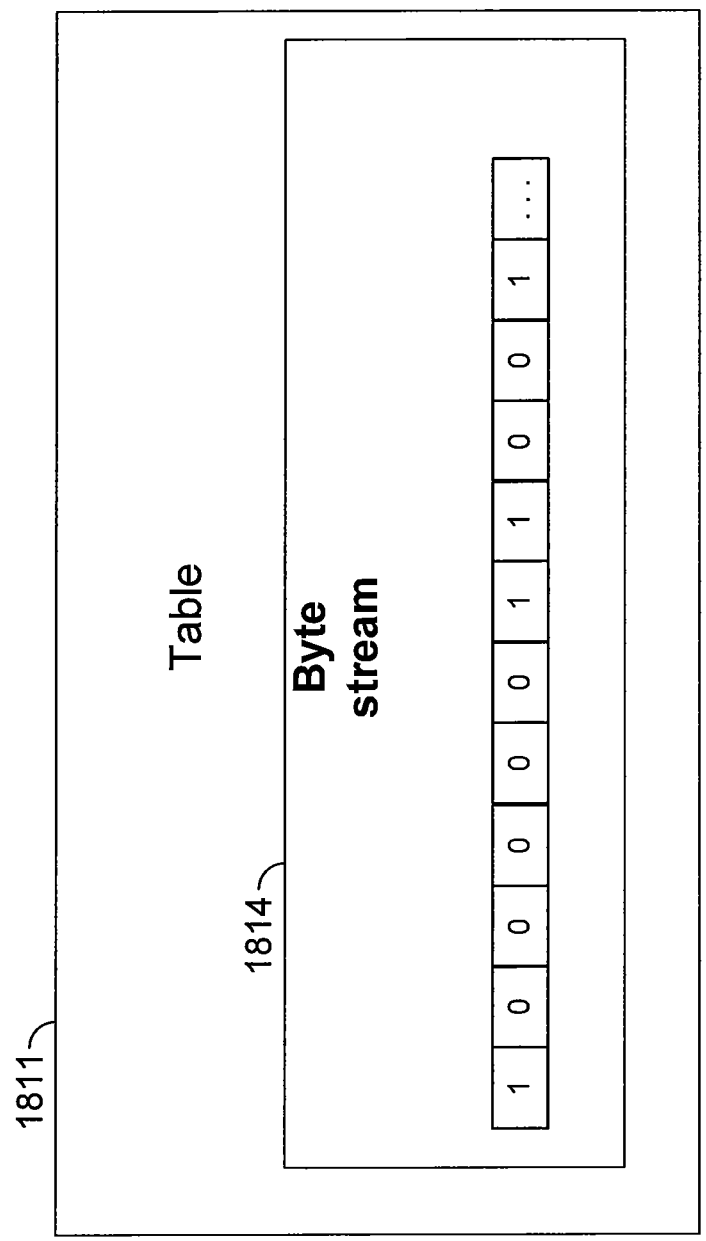
FIG. 18 shows a decompressed font table in accordance with an embodiment.

At step 1706, the byte stream is decompressed based on the initial probability estimate to generate a decompressed font table. As shown in FIG. 18, a byte stream 1814 is decompressed based on the initial probability estimate (shown in initial probability chart 1610) to generate a decompressed font table 1811.

While decompressing, an initial probability estimate estimates the probability of the first digit in the compressed font data. Any number that falls between a first interval is equal to a first digit while any number falling between a second interval is equal to a second digit. For example, any number falling between 0 and 0.8 will be a "0" digit and any number falling between 0.8 and 1 will be a "1" digit. The compressed font data is decompressed by estimating the probability of digits. As the probabilities are only estimates, and not actual identities of digits, there may be a chance of inaccurate estimates. Should an inaccurate estimate be made as to the digital being a "0" digit or a "1" digit, the cost of inaccurate estimates may be minimal.

In an embodiment, if the initial probability table is shared between font service 104 and user device 106, the same initial probability estimates are at least initially applied to the compressed data. Therefore, user device 106 uses the shared initial probability table to decode and deduce the font file.

User device 106 uses the decompressed font file to display text. For example, decompressed font table 1811 is used to provide display of text rendered using fonts within a webpage (e.g. webpage 510 in FIG. 5). In an embodiment, table 1811 is substantially similar to table 210. Therefore, there is minimal (or no) error in receiving the font table.

By using adaptive arithmetic coding, compressing of fonts may save space by providing a smaller, compressed font file. This may result in less latency to transfer the fonts over the network. Additionally, this may result in speeding up compressing and decompression, while rendering a complex document or website containing fonts. This may be especially applicable to web fonts. Of course, the adaptive arithmetic coding and shared initial probably chart may be used for other purposes other than providing fonts. For example, it may be used to compress different elements within an application package file. According to an embodiment, one initial probability table could be used for XML resource data, another for Dalvik executable (.dex) files, and yet another for assets such as images.

In various embodiments, the method steps described herein, including the method steps described in FIGS. 7, 8, 13, 14, 15, and 17, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 7, 8, 13, 14, 15, and 17. Certain steps of the methods described herein, including one or more of the steps of FIGS. 7, 8, 13, 14, 15, and 17, may be performed by a server or by another processor in a network-based cloud-computing system. Certain steps of the methods described herein, including one or more of the steps of FIGS. 7, 8, 13, 14, 15, and 17, may be performed by a client computer in a network-based cloud computing system. The steps of the methods described herein, including one or more of the steps of FIGS. 7, 8, 13, 14, 15, and 17, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 7, 8, 13, 14, 15, and 17, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 19:
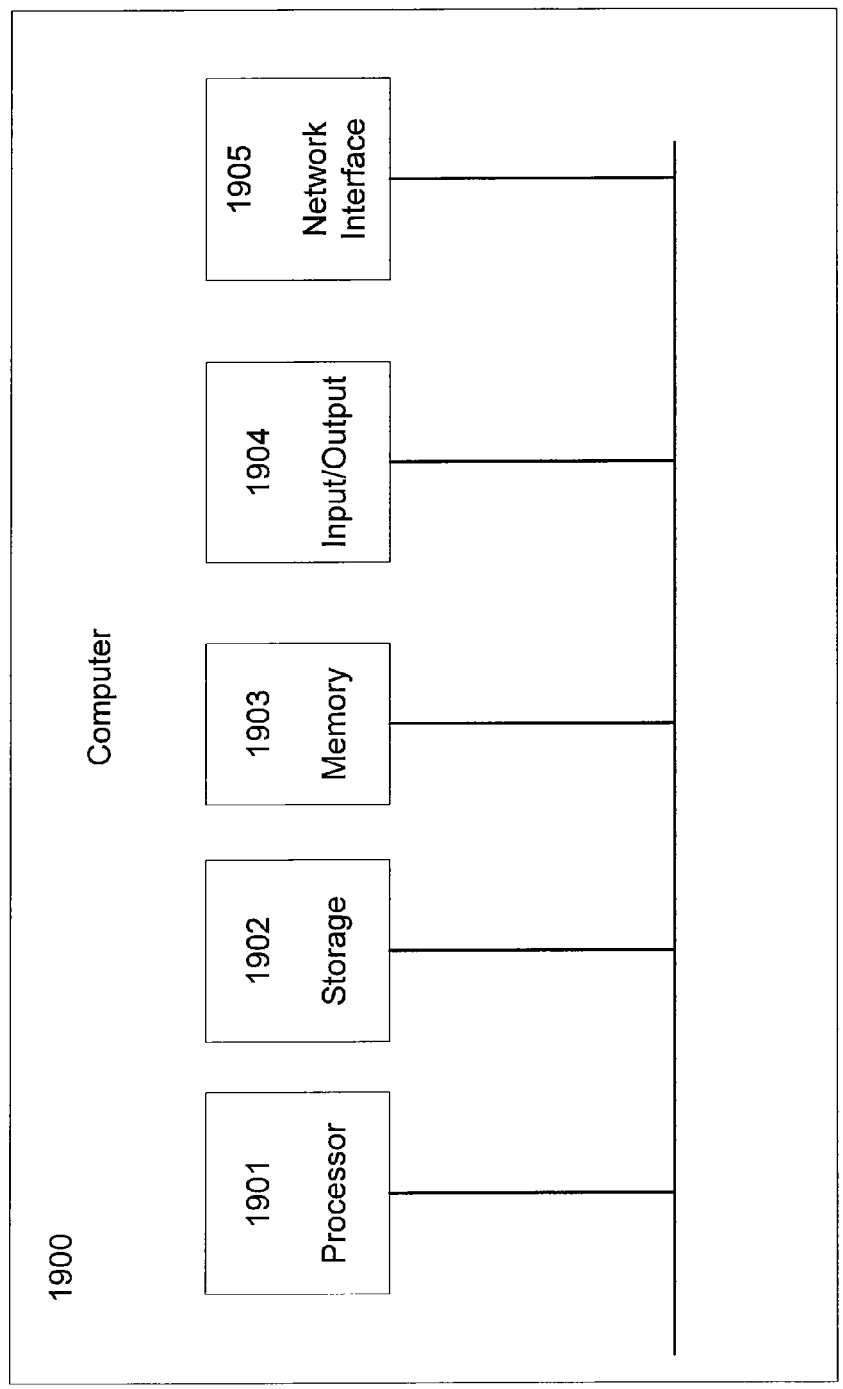
FIG. 19 shows components of a computer that may be used to implement the invention.

A high-level block diagram of an exemplary computer that may be used to implement systems, apparatus and methods described herein is illustrated in FIG. 19. Computer 1900 includes a processor 1901 operatively coupled to a data storage device 1902 and a memory 1903. Processor 1901 controls the overall operation of computer 1900 by executing computer program instructions that define such operations. The computer program instructions may be stored in data storage device 1902, or other computer readable medium, and loaded into memory 1903 when execution of the computer program instructions is desired. Thus, the method steps of FIGS. 7, 8, 13, 14, 15, and 17 can be defined by the computer program instructions stored in memory 1903 and/or data storage device 1902 and controlled by the processor 1901 executing the computer program instructions. For example, the computer program instructions can be implemented as computer executable code programmed by one skilled in the art to perform an algorithm defined by the method steps of FIGS. 7, 8, 13, 14, 15, and 17. Accordingly, by executing the computer program instructions, the processor 1901 executes an algorithm defined by the method steps of FIGS. 7, 8, 13, 14, 15, and 17. Computer 1900 also includes one or more network interfaces 1904 for communicating with other devices via a network. Computer 1900 also includes one or more input/output devices 1905 that enable user interaction with computer 1900 (e.g., display, keyboard, mouse, speakers, buttons, etc.).

Processor 1901 may include both general and special purpose microprocessors, and may be the sole processor or one of multiple processors of computer 1900. Processor 1901 may include one or more central processing units (CPUs), for example. Processor 1901, data storage device 1902, and/or memory 1903 may include, be supplemented by, or incorporated in, one or more application-specific integrated circuits (ASICs) and/or one or more field programmable gate lists (FPGAs).

Data storage device 1902 and memory 1903 each include a tangible non-transitory computer readable storage medium. Data storage device 1902, and memory 1903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1905 may include peripherals, such as a printer, scanner, display screen, etc. For example, input/output devices 1905 may include a display device such as a cathode ray tube (CRT) or liquid crystal display (LCD) monitor for displaying information to the user, a keyboard, and a pointing device such as a mouse or a trackball by which the user can provide input to computer 1900.

Any or all of the systems and apparatus discussed herein, including font service 104, website provider 108, user device 106, and components thereof, including processor 204, memory 206, database 208, font file 210, browser 302, display 304, memory 306, processor 404, and memory 406, may be implemented using a computer such as computer 1900.

One skilled in the art will recognize that an implementation of an actual computer or computer system may have other structures and may contain other components as well, and that FIG. 19 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving a compressed font file comprising compressed data;
   decompressing the compressed data to generate decompressed data;
   attempting to validate the decompressed data;

detecting within the decompressed data a predetermined pattern of invalid data;

determining a location of the predetermined pattern of invalid data;

determining an element of a font file based on the predetermined pattern of invalid data and the location of the predetermined pattern of invalid data, wherein the determined element comprises at least one of a bounding box associated with a glyph in the font file and a loca table that includes an indication of a start position of an entry within the loca table; and reconstructing the font file by replacing at least some of the invalid data with the determined element.

2. The method of claim 1, wherein the loca table is derived by scanning through a glyph table.

3. The method of claim 1 further comprising:
detecting within the decompressed data, valid data.

4. The method of claim 3, wherein reconstructing the font file further comprises:
reconstructing the font file to include the valid data.

5. The method of claim 1, wherein the predetermined pattern of invalid data comprises a predetermined number of zeroes.

6. A method comprising:

identifying redundant and non-redundant data in a table within a font file wherein the redundant data comprises at least one of a bounding box associate with a glyph in at least one of a plurality of tables in the font file and a loca table that includes an indication of a start position of an entry within the loca table;

applying a zeroing out procedure to replace the identified redundant data, wherein the identified redundant data is replaced with data arranged in a predetermined pattern based on a location of the redundant data in the table;

compressing the font file to generate a compressed font file; and transmitting the compressed font file.

7. The method of claim 6, wherein the loca table is derived by scanning through a glyph table.

8. The method of claim 6, wherein the predetermined pattern comprises a predetermined number of zeroes.

9. A non-transitory computer readable medium storing computer program instructions, which, when executed on a processor, cause the processor to perform a method comprising:

receiving a compressed font file comprising compressed data;

decompressing the compressed data to generate decompressed data;

attempting to validate the decompressed data;

detecting within the decompressed data a predetermined pattern of invalid data;

determining a location of the predetermined pattern of invalid data;

determining an element of a font file based on the predetermined pattern of invalid data and the location of the predetermined pattern of invalid data, wherein the determined element comprises at least one of a bounding box associated with a glyph in the font the and a loca table that includes an indication of a start position of an entry within the loca table; and reconstructing the font file by replacing at least some of the invalid data with the determined element.

10. The non-transitory computer readable medium of claim 9, wherein the loca table is derived by scanning through a glyph table.

11. The non-transitory computer readable medium of claim 9, further comprising instructions defining the step of:
detecting within the decompressed data, valid data.

12. The non-transitory computer readable medium of claim 11, wherein reconstructing the font file further comprises:
reconstructing the font file to include the valid data.

13. The non-transitory computer readable medium of claim 9, wherein the predetermined pattern of invalid data comprises a predetermined number of zeroes.

* * * * *